United States Patent
Wang

(10) Patent No.: US 9,019,199 B2
(45) Date of Patent: Apr. 28, 2015

(54) ELECTROPHORETIC DISPLAY APPARATUS SWITCHABLE BETWEEN BLACK-WHITE MODE AND COLOR MODE

(71) Applicant: E Ink Holdings Inc., Hsinchu (TW)

(72) Inventor: Shih-Yu Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 137 days.

(21) Appl. No.: 13/669,465

(22) Filed: Nov. 6, 2012

(65) Prior Publication Data

US 2013/0257708 A1    Oct. 3, 2013

Related U.S. Application Data

(60) Provisional application No. 61/619,462, filed on Apr. 3, 2012.

(30) Foreign Application Priority Data

Jul. 11, 2012    (TW) .............................. 101124938 A

(51) Int. Cl.
G09G 3/34 (2006.01)
G02F 1/167 (2006.01)

(52) U.S. Cl.
CPC ...................................... G02F 1/167 (2013.01)

(58) Field of Classification Search
None
See application file for complete search history.

(56) References Cited

U.S. PATENT DOCUMENTS

| | | | |
|---|---|---|---|
| 5,615,024 A | 3/1997 | May et al. | |
| 6,104,854 A * | 8/2000 | Masaki et al. | 385/133 |
| 6,678,023 B1 * | 1/2004 | Yamazaki et al. | 349/95 |
| 7,484,874 B2 * | 2/2009 | Lee et al. | 362/607 |
| 8,545,035 B1 * | 10/2013 | Beguin et al. | 362/97.1 |
| 2006/0256259 A1 * | 11/2006 | Takagi et al. | 349/95 |
| 2006/0290892 A1 * | 12/2006 | Koide | 353/53 |
| 2007/0139582 A1 * | 6/2007 | Numata et al. | 349/61 |
| 2007/0268426 A1 * | 11/2007 | Jung | 349/62 |
| 2007/0285410 A1 * | 12/2007 | Shibasaki et al. | 345/204 |
| 2008/0225526 A1 * | 9/2008 | Yoshizawa et al. | 362/294 |
| 2009/0015738 A1 * | 1/2009 | Hong et al. | 349/15 |

(Continued)

FOREIGN PATENT DOCUMENTS

TW    201007267 A    2/2010

OTHER PUBLICATIONS

Corresponding Taiwanese Office Action that these art references were cited.

*Primary Examiner* — Kathy Wang-Hurst
*Assistant Examiner* — Josemarie G Acha, III
(74) *Attorney, Agent, or Firm* — CKC & Partners Co., Ltd.

(57) ABSTRACT

Disclosed herein is an electrophoretic display apparatus switchable between a black-white mode and a color mode. The electrophoretic display apparatus includes an electrophoretic display panel, a light guide, a light source, a light-splitting element and a lens element. The light guide is disposed in front of a display area of the electrophoretic display panel. The light source is operable to emit a light, which is directed to the display area by the light guide. The light-splitting element is disposed between the light guide and the electrophoretic display panel, and is operable to split the light into a first, a second and a third beam each having a principal wavelength different from the others. The lens element is disposed between the light-splitting element and the display area, and is operable to direct the first, second and third beams to corresponding sub-pixels.

11 Claims, 4 Drawing Sheets

(56) References Cited

U.S. PATENT DOCUMENTS

| | | | |
|---|---|---|---|
| 2009/0316274 A1* | 12/2009 | Lee et al. | 359/634 |
| 2009/0323194 A1* | 12/2009 | Lin et al. | 359/639 |
| 2010/0103350 A1* | 4/2010 | Arai et al. | 349/64 |
| 2010/0123953 A1* | 5/2010 | Wu et al. | 359/625 |
| 2010/0177025 A1* | 7/2010 | Nagata et al. | 345/76 |
| 2010/0225852 A1* | 9/2010 | Taira et al. | 349/84 |
| 2010/0265577 A1* | 10/2010 | Kim et al. | 359/463 |
| 2010/0321596 A1* | 12/2010 | Ishikura | 349/5 |
| 2011/0002140 A1* | 1/2011 | Tsukahara et al. | 362/602 |
| 2011/0019128 A1* | 1/2011 | Takata | 349/62 |
| 2011/0234942 A1* | 9/2011 | Nakagome et al. | 349/64 |
| 2011/0249093 A1* | 10/2011 | Yeh et al. | 348/46 |
| 2012/0127140 A1* | 5/2012 | Ryan et al. | 345/207 |

* cited by examiner

ELECTROPHORETIC DISPLAY APPARATUS SWITCHABLE BETWEEN BLACK-WHITE MODE AND COLOR MODE

CROSS REFERENCE TO RELATED APPLICATIONS

This application claims priority to U.S. Provisional Application Ser. No. 61/619,462 filed Apr. 3, 2012, and Taiwan Application Serial Number 101124938, filed Jul. 11, 2012, the disclosures of which are incorporated herein by reference in their entireties.

BACKGROUND

1. Technical Field

The present invention relates to an electrophoretic display apparatus. More particularly, the present invention relates to an electrophoretic display apparatus switchable between a black-white mode and a color mode.

2. Description of Related Art

Conventional electrophoretic display devices exhibit black-white images and can not provide colorful images. For the purpose of providing colorful images, many researches attempt to add color filters in conventional electrophoretic display devices. However, the pigment or dye in the color filters adsorbs about two-third of incident light so that the brightness of the electrophoretic display devices is significantly decreased. In addition, this kind of electrophoretic display devices exhibits color images only, and can not be switchable between a black-white mode and a color mode. Therefore, there exists in this art a need for a new electrophoretic display apparatus which is capable of resolving these issues.

SUMMARY

According to one aspect of the present disclosure, there is provided an electrophoretic display apparatus switchable between a black-white mode and a color mode. The electrophoretic display apparatus includes an electrophoretic display panel, a light guide, a light source, a light-splitting element and a lens element. The electrophoretic display panel has a display area, which includes a first sub-pixel, a second sub-pixel and a third sub-pixel. The light guide is positioned over the display area, in which the light guide has a light receiving surface and a light emitting surface that faces the display area. The light source is for emitting a light into the light receiving surface, in which the light guide is operable to direct the light towards the display area through the light emitting surface. The light-splitting element is interposed between the light guide and the electrophoretic display panel. The light-splitting element is capable of splitting the light directed towards the display area into a first light beam, a second light beam and a third light beam each having a wavelength different from one another. The first light beam, the second light beam and the third light beam are transmitted in different directions. The lens element is for directing the first light beam, the second light beam and the third light beam to the first sub-pixel, the second sub-pixel and the third sub-pixel, respectively. The lens element is disposed between the light-splitting element and the electrophoretic display panel. When the light source is turned on, the electrophoretic display apparatus is operated in the color mode. When the light source is turned off, the electrophoretic display apparatus is operated in the black-white mode.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1A:
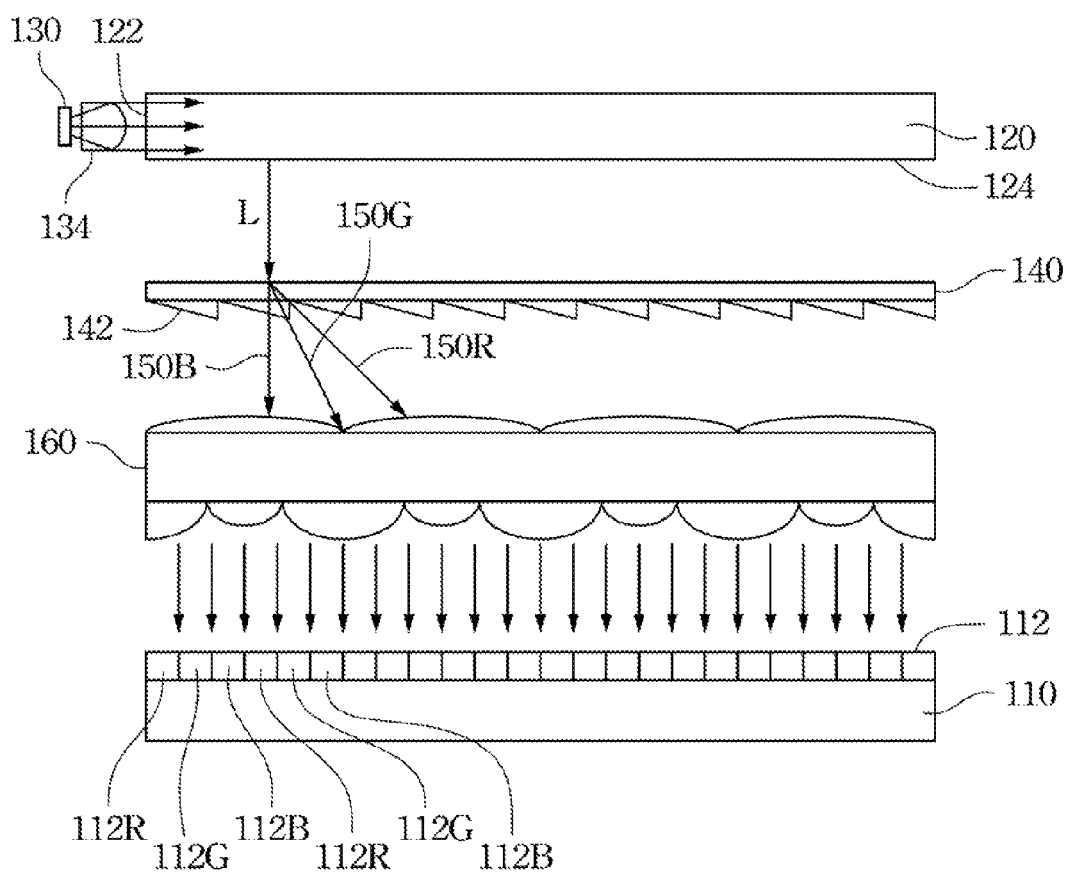
FIG. 1A is a cross-sectional view schematically illustrating an electrophoretic display apparatus according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

FIG. 1A is a cross-sectional view schematically illustrating an electrophoretic display apparatus 100 according to one embodiment of the present disclosure. One feature of the electrophoretic display apparatus 100 is that the electrophoretic display apparatus 100 may be operated in two modes, i.e. a black-white mode and a color mode. Specifically, the electrophoretic display apparatus 100 is switchable between the black-white mode and the color mode. As depicted in FIG. 1A, the electrophoretic display apparatus 100 includes an electrophoretic display panel 110, a collimated light guide 120, a light source 130, a light-splitting element 140 and a lens element 160.

The electrophoretic display panel 110 has a display area 112, which includes a first sub-pixel 112R, a second sub-pixel 112G and a third sub-pixel 112B. The electrophoretic display panel 110 may be a microcup electrophoretic display panel or a microcapsule electrophoretic display panel. It is noted that the electrophoretic display panel 110 does not include conventional color filters having pigment or dye. When the electrophoretic display panel 110 is operated in the color mode, suitable optical elements are employed to split lights into divided lights with different wavelengths, and each of the divided lights is directed towards a proper sub-pixel such that an originally colorless sub-pixel may exhibit colors, which is described in detail hereinafter. In FIG. 1A, the first sub-pixel 112R may be a red sub-pixel, which is illuminated by a red light and thus capable of exhibiting a red color. The second sub-pixel 112G may be a green sub-pixel, which is illuminated by a green light and thus capable of exhibiting a green color. The third sub-pixel 112B may be a blue sub-pixel, which is illuminated by a blue light and thus capable of exhibiting a blue color.

The collimated light guide 120 has a light receiving surface 122 and a light emitting surface 124. The collimated light guide 120 is positioned over the display area 112 of the electrophoretic display panel 110, and the light emitting surface 124 faces the display area 112. The collimated light guide 120 allows a light L to be emitted from the light emitting surface 124, and the transmitting direction of the light L is substantially perpendicular to the light emitting surface 124. In one embodiment, the transmitting direction of the light L forms an included angle of less than about 10 degrees with a normal vector of the light emitting surface 124. Furthermore, the collimated light guide 120 allows visible light to be transmitted from the light emitting surface 124 to a surface opposite thereto.

The light source 130 is configured to emit a light into the light receiving surface 122 of the collimated light guide 120, in which the collimated light guide 120 may direct the light towards the display area 112 through the light emitting surface 124. In one embodiment, the light source 130 includes a red light emitting diode (LED), a green LED and a blue LED. The red LED may emit a light having a principal wavelength of about 600 nm to about 700 nm. The green LED may emit a light having a principal wavelength of about 500 nm to about 600 nm. The blue LED may emit a light having a principal wavelength of about 380 nm to about 480 nm. In the present disclosure, the term "principal wavelength" refers to the wavelength at which a maximum intensity is observed in the spectral distribution of a light. In another embodiment, the light source 130 may be a laser capable of emitting a white light beam or a LED capable of emitting white light.

The light-splitting element 140 is interposed between the light guide 120 and the electrophoretic display panel 110, and capable of splitting the light L emitted from the light emitting surface 124 into a first light beam 150R, a second light beam 150G and a third light beam 150B. Each of the first, second and third light beams 150R, 150G, 150B has a principal wavelength different from that of another one of the first, second and third light beams 150R, 150G 150B. Furthermore, the first, second and third light beams 150R, 150G, 150B are transmitted and travel in different directions. In one embodiment, the light-splitting element 140 has a plurality of triangular prisms 142 formed on a surface facing the display area 112. The crest line of each of the triangular prisms 142 is parallel to that of another one of the triangular prisms 142. More specifically, the light L has at least three different wavelengths, each having a refractive index different from the others in the triangular prism 142, and therefore when the light L passes through the triangular prism 142, the light L is split into the first, second and third light beams 150R, 150G, 150B that project to different directions. In one example, the first, second and third light beams 150R, 150G, 150B are respectively a red light beam, a green light beam and a blue light beam. In another example, the triangular prism 142 is an asymmetrical triangular prism, which has an apex angle of about 70 degrees to about 100 degrees. The width of each of the triangular prisms 142 may be about 0.5 μm to about 5 μm.

The lens element 160 is disposed between the light-splitting element 140 and the electrophoretic display panel 110, and capable of directing the first, second and third light beams 150R, 150G, 150B respectively to the first, second and third sub-pixels 112R, 112B, 112B of the electrophoretic display panel 110. As described hereinbefore, the electrophoretic display panel 11 exhibits merely a black color, a white color or a gray color. When the first, second and third light beams 150R, 150G, 150B with certain colors respectively project to the first, second and third sub-pixels 112R, 112B, 112B, the incident lights are reflected by the white pigment particles in the first, second and third sub-pixels 112R, 112B, 112B such that an originally colorless sub-pixels may exhibit colors. Therefore, the electrophoretic display apparatus according to the embodiments disclosed herein may exhibit color images, in which conventional color filters are no longer required. Furthermore, when the light source 130 is turned on, the light emitted from the light source 130 travels along the optical path described hereinbefore such that the electrophoretic display apparatus 100 is operated in the color mode. To the contrary, when the light source 130 is turned off, the ambient light does not travel along the aforementioned optical path so that the electrophoretic display apparatus 100 is operated in the black-white mode. Accordingly, one feature of the present disclosure is that the electrophoretic display apparatus 100 is switchable between the black-white mode and the color mode.

Figure 1B:
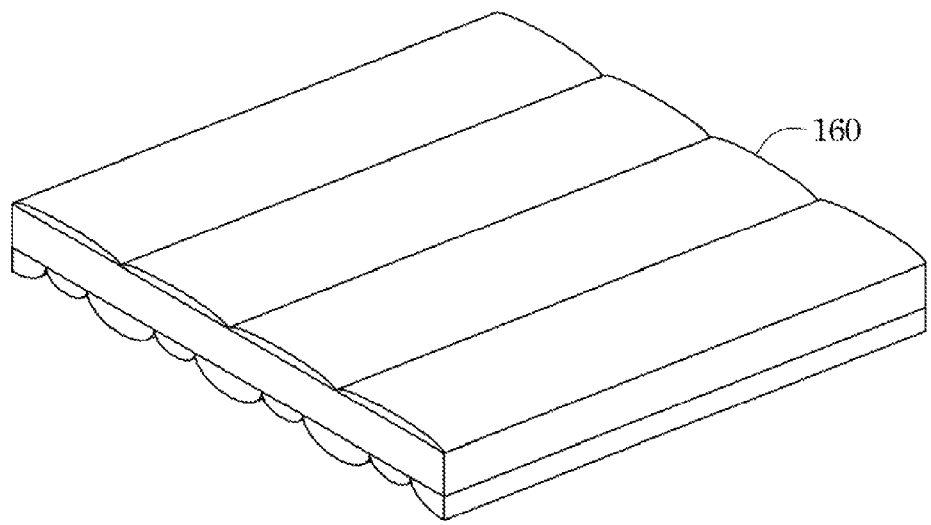
FIG. 1B is a perspective view schematically illustrating a lens element according to one embodiment of the present disclosure.
Figure 1C:
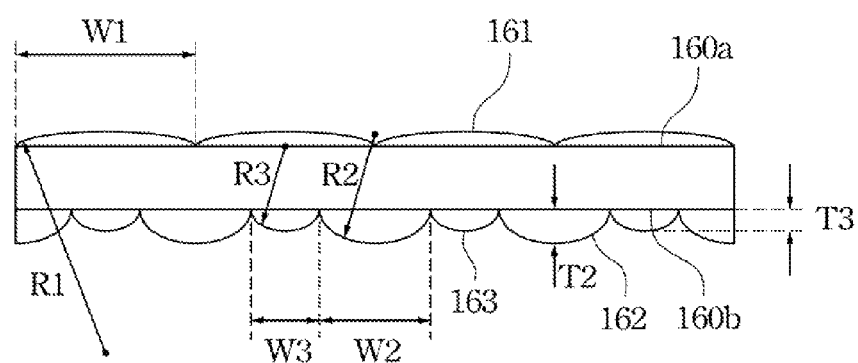
FIG. 1C is a cross-sectional view schematically illustrating the lens element shown in FIG. 1B.

FIG. 1B is a perspective view schematically illustrating a lens element 160 according to one embodiment of the present disclosure. FIG. 1C is a cross-sectional view showing the lens element 160 in FIG. 1B. As depicted in FIG. 1C, the lens element 160 has a first surface 160a and a second surface 160b, the first surface 160a faces the light-splitting element 140, whereas the second surface 160b is opposite to the first surface 160a. The lens element 160 includes a plurality of first cylindrical lenses 161, a plurality of second cylindrical lenses 162 and a plurality of third cylindrical lenses 163. These first cylindrical lenses 161 are formed in parallel with each other on the first surface 160a. The second cylindrical lenses 162 are formed in parallel with each other on the second surface 160b, and the third cylindrical lenses 163 are formed in parallel with each other on the second surface 160b. In addition, the third cylindrical lenses 163 are parallel with the second cylindrical lenses 162. Each of the second cylindrical lenses 162 and each of the third cylindrical lenses 163 are alternately arranged. It is note that the thickness T2 of each of the second cylindrical lenses 162 is greater than the thickness T3 of each of the third cylindrical lenses 163.

In one example, on the first surface 160a, each of the first cylindrical lenses 161 adjoins another one of the first cylindrical lenses 161. On the second surface 160b, each of the second cylindrical lenses 162 adjoins one of the third cylindrical lenses 162.

In another example, the width W1 of each of the first cylindrical lenses 161 is greater than the width W2 of each of the second cylindrical lenses 162, and each of the second cylindrical lenses 162 is arranged at a position opposite to a common adjoining edge between two adjoined first cylindrical lenses 161.

In still another example, the radius of curvature R1 of each of the first cylindrical lenses 161 is greater than the radius of curvature R2 of each of the second cylindrical lenses 162. Furthermore, the radius of curvature R2 of each of the second cylindrical lenses 162 is different from the radius of curvature R3 of each of the third cylindrical lenses 163.

In one embodiment, as depicted in FIG. 1A, the electrophoretic display apparatus 100 may further comprise a lens 134. The lens 134 may be a convex lens, for example, disposed between the light source 130 and the light receiving surface 122, and is configured to convert the light emitted from the light source 130 into a parallel light beam.

Figure 2A:
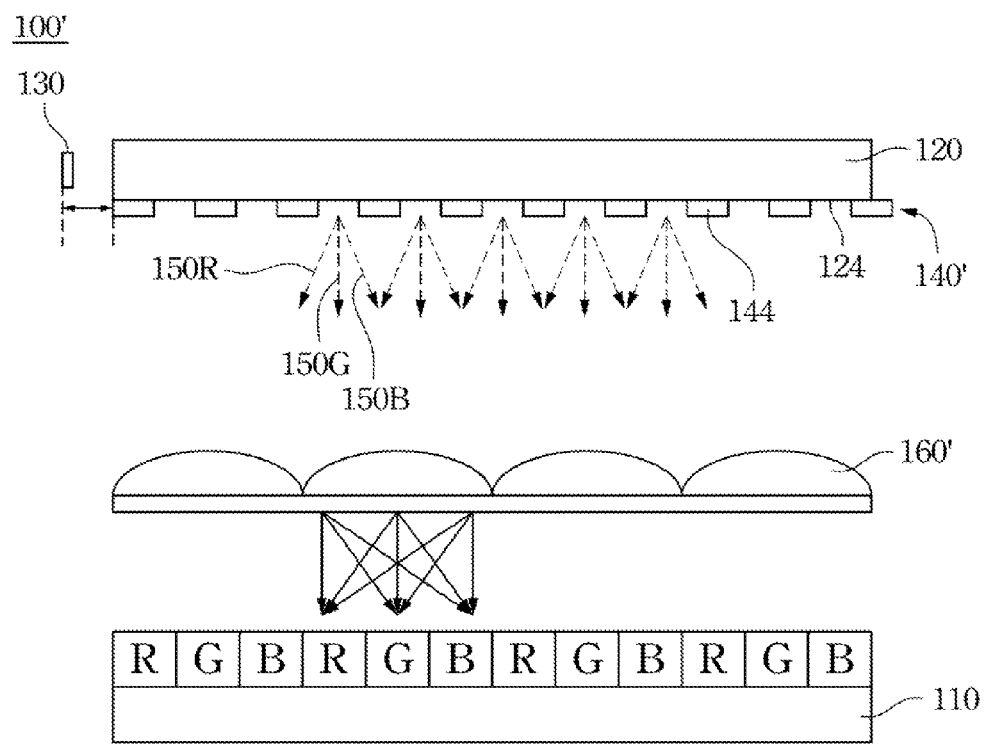
FIG. 2A is cross-sectional view schematically illustrating an electrophoretic display apparatus according to another embodiment of the present disclosure.

FIG. 2A is cross-sectional view schematically illustrating an electrophoretic display apparatus 100' according to another embodiment of the present disclosure. The electrophoretic display apparatus 100' includes an electrophoretic display panel 110, a collimated light guide 120, a light source 130, a light-splitting element 140' and a lens element 160'. The electrophoretic display apparatus 100' has a structure similar to that of the embodiment depicted in FIG. 1A. However, the light-splitting element 140' and the lens element 160' of the electrophoretic display apparatus 100' is different from that of the electrophoretic display apparatuses 100 depicted in FIG. 1A. In the embodiment depicted in FIG. 2A, the electrophoretic display panel 110, the collimated light guide 120, the light source 130 may be the same as these described above in connection with FIG. 1A.

Figure 2B:
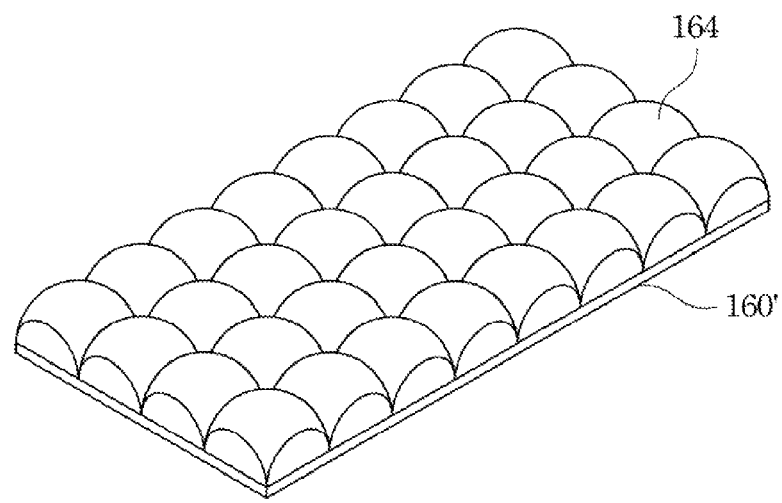
FIG. 2B is a perspective view showing the aspherical lens array according to one example of the present disclosure.

In the embodiment depicted in FIG. 2A, the light-splitting element 140' includes a diffraction grating 144 that is in contact with the light emitting surface 124. The light emitted from the light emitting surface 124 has different wavelengths. When the light with different wavelengths passes through the diffraction grating 144, it is split into a first, a second and a third light beam 150R, 150G, 150B that travel in different directions. Each of the first, second and third light beams 150R, 150G, 150B has a principal wavelength different from that of another one of the first, second and third light beams 150R, 150G, 150B. Additionally, in this embodiment, the lens element 160' is an aspherical lens array. FIG. 2B is a perspective view showing the aspherical lens array according to one example of the present disclosure. The aspherical lens array is comprised of a plurality of a number of aspheric lenses 164. The aspherical lens array is configured to direct the first, second and third light beams 150R, 150G, 150B respectively to corresponding sub-pixels.

Figure 3A:
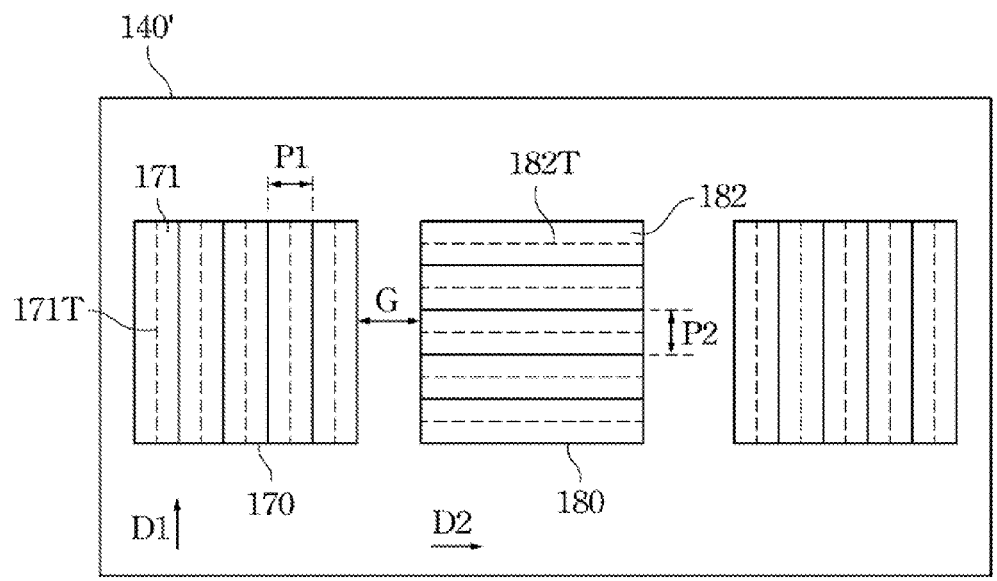
FIG. 3A is a top view schematically illustrating a light-splitting element according to still another embodiment of the present disclosure.
Figure 3B:
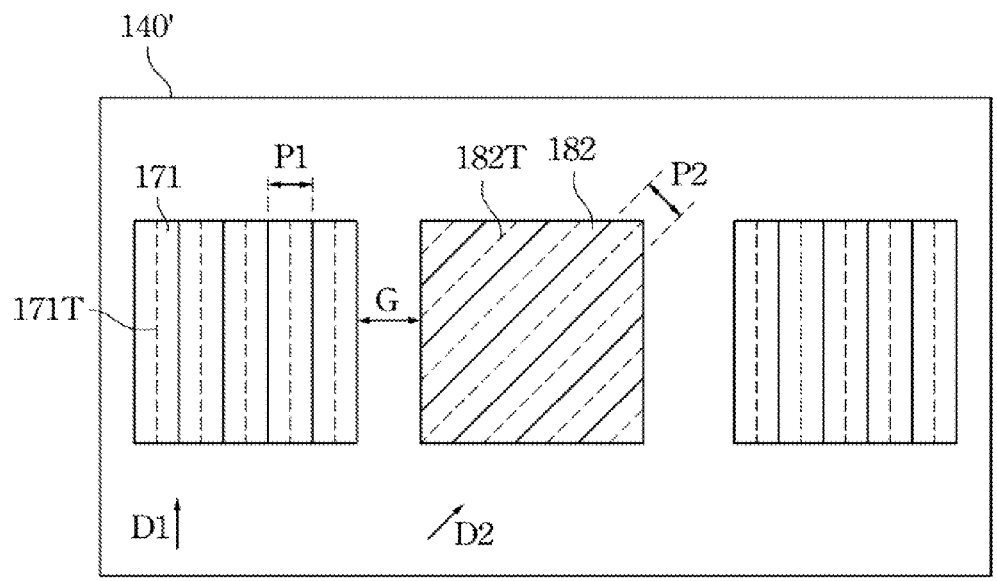
FIG. 3B is a top view schematically illustrating a light-splitting element according to still another embodiment of the present disclosure.

FIG. 3A is a top view schematically illustrating a light-splitting element 140' according to still another embodiment of the present disclosure. The light-splitting element 140' at least includes a first refraction grating array 170 and a second refraction grating array 180, in which the first refraction grating array 170 and the second refraction grating array 180 are spaced apart by a spacing G. The first refraction grating array 170 has a plurality of first prisms 171. Each of the first prisms 171 has a first crest line 171T that is parallel to a first direction D1, and these first prisms 171 are arranged in a regular manner. Specifically, each first crest line 171T is separated from an adjacent first crest line 171T by a first pitch distance P1. Similarly, the second refraction grating array 180 has a plurality of second prisms 182. Each of the second prisms 182 has a second crest line 182T that is parallel to a second direction D2, and each second crest line 182T is separated from an adjacent second crest line 182T by a second pitch distance P2. In this embodiment, the first direction D1 is not parallel with the second direction D2. For instance, the first direction D1 may be perpendicular to the second direction D2, as depicted in FIG. 3A. Alternatively, the included angle between the first direction D1 and the second direction D2 may be about 5 degrees to 85 degrees, as depicted in FIG. 3B. In another embodiment, the first pitch distance P1 is not equal to the second pitch distance P2. According to the embodiments in connection with FIG. 3A and FIG. 3B, the spectrum pattern generated by the light-splitting element 140' may be modulated. Particularly, when the light emitted from the collimated light guide 120 passes through the light-splitting element 140, it may be split into several light beams with different principal wavelengths, and thus generating a spectrum pattern. However, in some embodiments, the spectrum pattern is undesirably rotated or deformed. Accordingly, the embodiments described above are intended to modulate the rotated or deformed spectrum pattern such that the lens element 160' may correctly direct the first, second and third light beams 150R, 150G, 150B to corresponding sub-pixels.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrophoretic display apparatus switchable between a black-white mode and a color mode, the electrophoretic display apparatus comprising:

an electrophoretic display panel having a display area, the display area comprising a first sub-pixel, a second sub-pixel and a third sub-pixel;

a light guide positioned over the display area, wherein the light guide has a light receiving surface and a light emitting surface that faces the display area;

a light source for emitting a light into the light receiving surface, wherein the light guide is operable to direct the light towards the display area through the light emitting surface;

a light-splitting element interposed between the light guide and the electrophoretic display panel, and capable of splitting the light directed towards the display area into a first light beam, a second light beam and a third light beam each having a wavelength different from one another, wherein the first light beam, the second light beam and the third light beam are transmitted in different directions; and a lens element for directing the first light beam, the second light beam and the third light beam to the first sub-pixel, the second sub-pixel and the third sub-pixel, respectively, the lens element being disposed between the light-splitting element and the electrophoretic display panel, wherein the lens element has a first surface facing the light-splitting element, and a second surface opposite to the first surface, and the lens element comprises:

a plurality of first cylindrical lenses formed in parallel with each other on the first surface;

a plurality of second cylindrical lenses formed in parallel with each other on the second surface; and a plurality of third cylindrical lenses formed in parallel with each other on the second surface, wherein the third cylindrical lenses are parallel with the second cylindrical lenses, and each of the second cylindrical lenses and each of the third cylindrical lenses are alternately arranged, wherein each of the second cylindrical lenses has a thickness that is greater than a thickness of each of the third cylindrical lenses;

wherein when the light source is turned on, the electrophoretic display apparatus is operated in the color mode, and when the light source is turned off, the electrophoretic display apparatus is operated in the black-white mode.

2. The electrophoretic display apparatus according to claim 1, wherein the light-splitting element comprises a plurality of triangular prisms each having a crest line, and the crest lines are arranged in parallel with each other.

3. The electrophoretic display apparatus according to claim 1, wherein the light-splitting element comprises a diffraction grating that is in contact with the light emitting surface.

4. The electrophoretic display apparatus according to claim 1, wherein each of the first cylindrical lenses adjoins another one of the first cylindrical lenses, and each of the second cylindrical lenses adjoins one of the third cylindrical lenses.

5. The electrophoretic display apparatus according to claim 4, wherein each of the first cylindrical lenses has a width greater than a width of each of the second cylindrical lenses, and each of the second cylindrical lenses is arranged at a position opposite to a common adjoining edge between two adjoined first cylindrical lenses.

6. The electrophoretic display apparatus according to claim 1, wherein each of the first cylindrical lenses has a radius of curvature greater than a radius of curvature of each of the second cylindrical lenses.

7. The electrophoretic display apparatus according to claim 1, wherein each of the second cylindrical lenses has a radius of curvature that is different from a radius of curvature of each of the third cylindrical lenses.

8. The electrophoretic display apparatus according to claim 1, wherein the lens element is an aspherical lens array.

9. The electrophoretic display apparatus according to claim 1, further comprises a lens disposed between the light source and the light receiving surface.

10. The electrophoretic display apparatus according to claim 1, wherein the light-splitting element comprises:

a first refraction grating array having a plurality of first prisms, wherein each of the first prisms has a first crest line parallel with a first direction, and each first crest line is separated from an adjacent first crest line by a first pitch distance; and a second refraction grating array having a plurality of second prisms, wherein each of the second prisms has a second crest line parallel with a second direction, and each second crest line is separated from an adjacent second crest line by a second pitch distance;

wherein the first refraction grating array and the second refraction grating array are spaced apart by a spacing, and the first direction is not parallel with the second direction.

11. The electrophoretic display apparatus according to claim 10, wherein the first pitch distance is not equal to the second pitch distance.

\* \* \* \* \*